April 18, 1967 S. R. AHLMAN 3,314,737
RETAINER
Filed Dec. 19, 1962 2 Sheets-Sheet 1
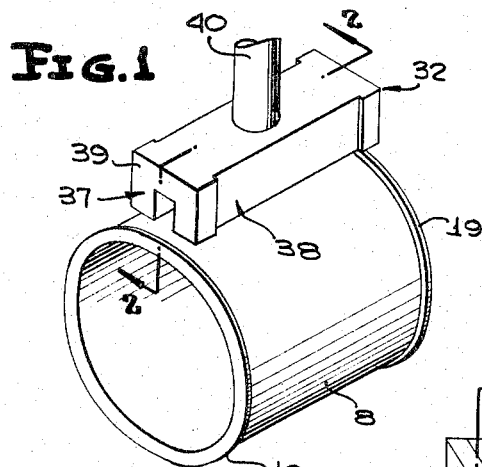
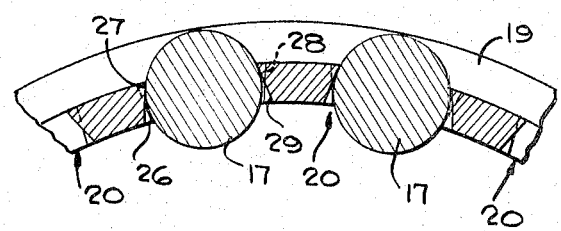
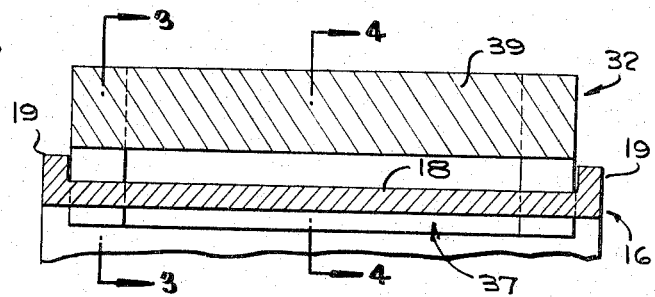
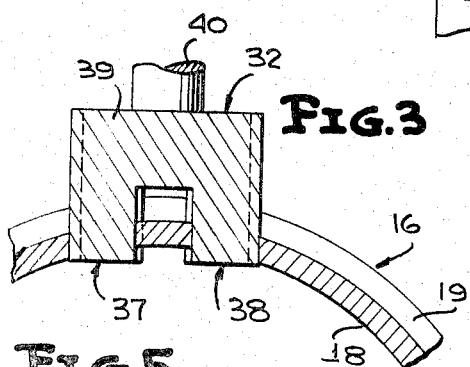
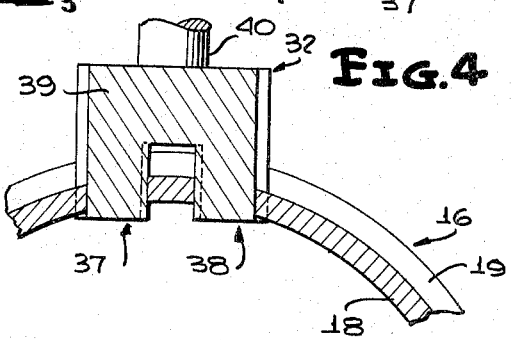
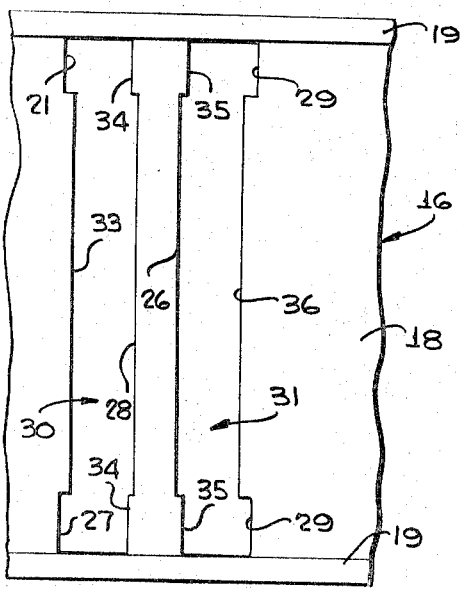
INVENTOR
SVEN ROBERT AHLMAN
BY
Mason, Porter, Diller & Stewart
ATTORNEYS April 18, 1967  S. R. AHLMAN  3,314,737
RETAINER
Filed Dec. 19, 1962  2 Sheets-Sheet 2
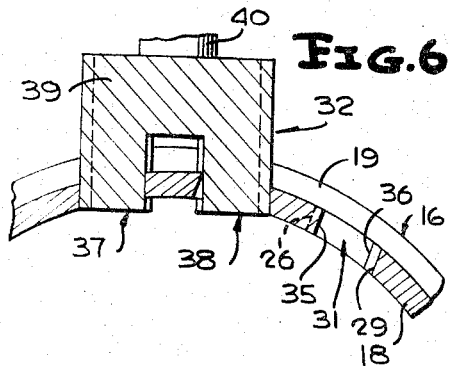
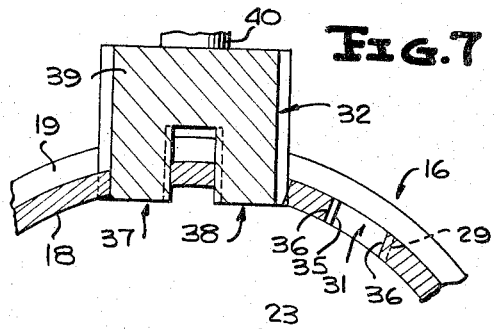
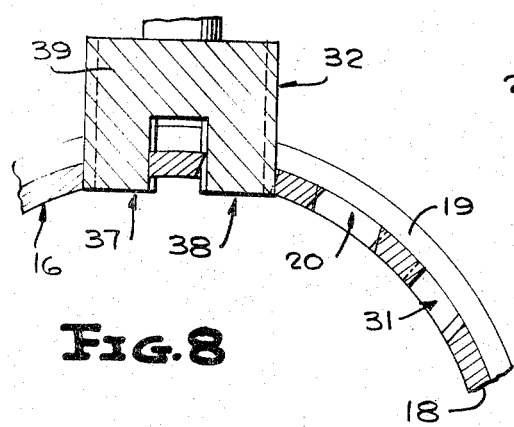
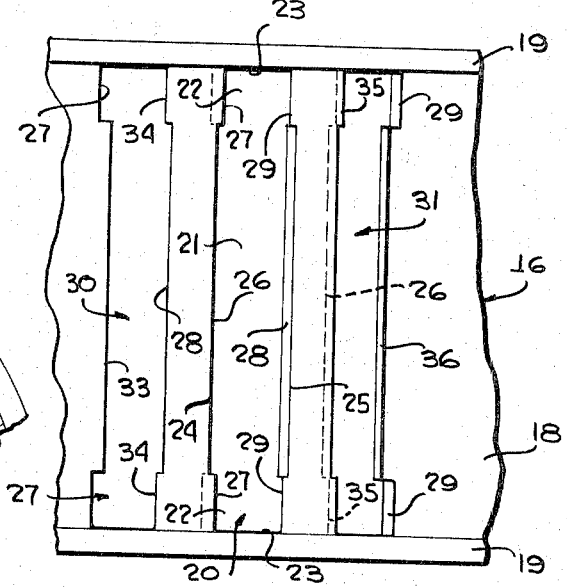
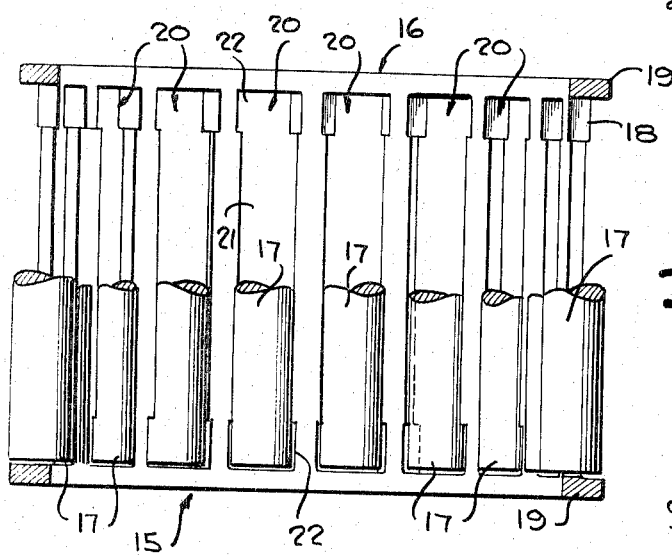
INVENTOR
SVEN ROBERT AHLMAN
BY
Mason, Porter, Diller & Stewart
ATTORNEYS

United States Patent Office 3,314,737
Patented Apr. 18, 1967

3,314,737
RETAINER
Sven Robert Ahlman, Litchfield, Conn., assignor to The Torrington Company, Torrington, Conn., a corporation of Maine
Filed Dec. 19, 1962, Ser. No. 245,736
3 Claims. (Cl. 308—217)

This invention relates in general to new and useful improvements in the art of making bearings, and more particularly to a novel bearing retainer and the method of and apparatus for making the same.

This invention particularly relates to bearing retainers of the type for retaining rollers.

A primary object of this invention is to provide a retainer for bearings which may be readily formed in a continuously operating machine and which is so constructed wherein the individual rollers may be snapped thereinto and retained thereby.

Another object of this invention is to provide a novel retainer for bearings wherein the retainer is formed with a plurality of windows, there being one window for each roller, and each of the windows having two opposed sides, the retainer being further distinguished in that each of the window sides includes a central wall and outer walls which are disposed in angular crossing relation so that the walls defining each side of a window combine to define a generally V-shaped pocket which opens towards the opposite wall of the respective window and thus provide adequate roller retaining means.

Another object of this invention is to provide a novel retainer for bearings wherein the retainer is formed with a plurality of roller receiving windows, each of the windows including a central portion and two end portions, each of the portions of the windows being trapezoidal in cross-section with the cross-section of the central portion of each window flaring in an opposite direction from the cross-section of the end portions of the same window so that the central portions of a window combine with end portions of the window to snappingly receive and retain a roller therein.

With the above and other objects in view that will hereinafter appear, the nature of the invention will be more clearly understood by reference to the following detailed description, the appended claims and the several views illustrated in the accompanying drawing:

In the drawing:

FIGURE 1 is a schematic perspective view showing the relationship of a punch and retainer prior to the initial operation of the punch to form windows in the retainer.

FIGURE 2 is an enlarged fragmentary longitudinal sectional view taken along the line 2—2 of FIGURE 1, and shows the specific relationship of the punch with respect to an associated portion of the retainer, the punch being moved from its position of FIGURE 1 to pass partially through the retainer.

FIGURE 3 is an enlarged fragmentary transverse vertical sectional view taken along the line 3—3 of FIGURE 2 and shows the cross-section of the punch adjacent an end of the retainer.

FIGURE 4 is an enlarged fragmentary transverse vertical sectional view similar to FIGURE 3 and taken along the line 4—4 of FIGURE 2, and shows the specific cross-section of the punch in a central portion of the retainer.

FIGURE 5 is an enlarged fragmentary plan view of the upper part of the retainer after the first punching operation.

FIGURE 6 is an enlarged fragmentary transverse vertical sectional view similar to FIGURE 3, and shows the retainer in a rotated position and the punch engaged with the retainer in a second punching operation.

FIGURE 7 is an enlarged fragmentary transverse sectional view similar to FIGURE 6, but taken through the central portion of the retainer.

FIGURE 8 is an enlarged fragmentary transverse vertical sectional view similar to FIGURES 3 and 6, and shows the details of the retainer with the punch in position during a third punching operation and one of the windows of the retainer being separate from the punch and completely formed.

FIGURE 9 is an enlarged fragmentary plan view of the retainer of FIGURES 6 and 7, and shows the general details of the formation of the roller receiving windows formed therein.

FIGURE 10 is a horizontal sectional view taken through a completely formed bearing assembly including the retainer with rollers disposed therein, the rollers being broken away and omitted from one longitudinal half of the retainer in order to clearly illustrate the details of the windows formed within the retainer.

FIGURE 11 is an enlarged fragmentary transverse vertical sectional view taken through an upper portion of a bearing assembly and through one end of the retainer, and shows the specific manner in which rollers are retained within the retainer.

FIGURE 12 is a transverse vertical sectional view on a large scale similar to FIGURE 11, with the view being taken through the central portion of the retainer and shows the cross-section of the central portions of the retainer windows.

Referring now to the drawings in detail, reference is first made to FIGURES 10, 11 and 12 wherein there is illustrated a bearing assembly formed in accordance with this invention, the bearing assembly being generally referred to by the numeral 15. The bearing assembly 15 is formed of a retainer, generally referred to by the numeral 16, and a plurality of rollers 17 carried by the retainer 16. The rollers 17 are conventional and need not be described in more detail hereinafter.

The retainer 16 is of a one-piece cylindrical construction and includes a cylindrical body 18 and flanged ends 19. The retainer 16 is intended to be mounted within a bore of an outer race (not shown). Although flanged ends 19 of the retainer 16 are shown, it is to be understood that the cylindrical body 18 may have thickened portions and that the thickness of the thickened portions of the body 18 may be up to the thickness of the flanged ends 19. By thickening the portions of the body 18, additional wearing surfaces may be obtained for the retainer 16.

The body 18 of the retainer 16 is provided with a plurality of circumferentially spaced windows which are each generally identified by the numeral 20. It is the specific shape of the windows 20, relationship of the windows 20 to the rollers 17, the method in which the windows 20 are formed and the specific punch for forming the windows which constitute this invention. Each window 20 includes a central portion 21 and a pair of end portions 22.

Referring now to the central part of the bearing retainer 16, as is shown in its partially formed condition of FIGURE 9, it will be seen that a fully formed window 20 has opposite ends 23 which are disposed along the inner faces of the flanged ends 19. It will also be seen that each window 20 includes a pair of sides 24 and 25 which are in opposed relation. The sides 24 are formed of three or more walls which include central walls 26 and walls 27. The walls 27 lie in a common plane while walls 26 lie in a plane disposed in angular relation to the plane of the walls 27. The planes of the walls 26 and the walls 27 are disposed at equal angles to a radial plane extending generally through the side 24 and the two planes of the walls 26 and the walls 27 intersect within the thickness of the body 18, as is clearly shown in FIGURES 11 and 12. Due to the specific relationship of the walls 26 and the walls 27, the side 24 has a combined generally V-shaped bearing retaining surface arrangement which opposes the side 25.

The side 25 of each window 20 includes walls 28 and walls 29, the walls 29 lying in a common plane. The plane of the walls 29 is disposed in angular relation to the plane of the walls 28 with the two planes being disposed in opposite equal angular relationship to a radial plane extending generally through the side 25. The two planes of the walls 28 and the walls 29 intersect within the thickness of the retainer body 18, as is clearly shown in FIGURES 11 and 12. Thus, the combined roller engaging surfaces of the walls 28 and 29 provide a generally V-shaped roller engaging surface for the side 25 which opens toward the side 24.

At this time, it is pointed out that the walls 27 are disposed parallel to the walls 28 and the walls 29 are disposed parallel to the walls 26. Thus, the walls 26 and 29 can be formed in one punching operation, and the walls 27 and 28 formed in another punching operation. It is also pointed out that in the illustrated retainer construction, the cross-section of each window 20 is trapezoidal. However, the cross-section is not constant throughout the length of the window 20. As is clearly shown in FIGURE 11, the end portions 22 of a window 20 flare inwardly whereas the central portion 21 of the same window flares outwardly. It is, of course, possible and may be desirable for the central portion of a window to flare inwardly and the outer portions of the same window to flare outwardly under some conditions.

From the foregoing description of a window 20 of the retainer 16, it will be readily apparent that a roller 17 may be readily snapped into a window 20 and be retained therein by the cooperating walls 26, 27, 28 and 29. Although the walls 26 and 28 are of much greater linear extent than the combined extent of the walls 27 and the walls 29, as has been stated above, if it is desired to thicken the retainer body 18 at the ends thereof, this may be done to provide additional wearing surfaces. A thickening of the ends of the retainer body 18 will result in an increase of the width of the walls 27 and 29.

Referring now to FIGURES 3, 4 and 5, it will be seen that the retainer body 18 is initially imperforate. In the first step of forming the windows 20 in the retainer body 18, two partially formed windows 30 and 31 are formed in the retainer body 18 by means of a punch, generally referred to by the numeral 32. The structure of the punch 32 will not be described now. However, it is pointed out that the punch 32 is moved along a radial plane passing intermediate the partially formed windows 30 and 31. In the initial punching operation, a partially formed window 30 is provided with walls 27 and 28 of the intended finished window 20. In addition, the window 30 is provided with a temporary wall 33 extending between the walls 27 and temporary walls 34 at opposite ends of the wall 28.

The partially formed windows 30 and 31, being symmetrical about the plane of movement of the punch 32, have like configurations and as a result, the finished walls of the partially formed window 31 are not the walls 27 and 28, as in the case of the partially formed window 30, but are the walls 26 and 29 which are symmetrically arranged with respect to the walls 28 and 27, respectively. The partially formed window 31 includes a pair of walls 35 which are disposed at opposite ends of the wall 26 and a wall 36 which extends between the walls 29.

The punch 32 includes a pair of punch elements 37 and 38 which are integrally connected by an upper cross-bar portion 39. A shank 40 is connected to the upper cross-bar portion 39 to effect the vertical reciprocation of the punch 32. The punch elements 37 and 38 have cross-sections corresponding to the outlines of the partially formed windows 30 and 31, respectively.

It is to be understood that the retainer 16 is supported by a suitable mandrel (not shown) during the operation of the punch 32. After the initial punching operation, the retainer 16 is rotated about the mandrel, that is, about the center of the retainer 16 a distance corresponding to the desired spacing of the windows 20. With the retainer 16 so indexed, the punch 32 is again operated to effect a second punching operation on the retainer body 18. During this second punching operation, the partially formed window 30, which was formed by the punch element 37, is shifted into alignment with the punch element 38, and an imperforate portion of the retainer body 18 is moved beneath the punch element 37. When the punch 32 is moved downwardly with the retainer body 18 so positioned, the punch element 37 forms a new partially formed window 30 in the retainer body 18 and the punch element 38 reshapes the previously formed window 30 so that it assumes the shape of the desired window 20, as is clearly shown in FIGURE 7. In the reshaping of the partially formed window 30, the walls 33 and 34 are removed and new walls 26 and 29 are formed.

It is to be understood that after the second punching operation, the retainer 16 is repeatedly rotated and indexed and the second punching operation is continuously repeated until such time as the partially formed window 31 is aligned with the punch element 37. During this final punching operation, while the punch element 38 is reshaping a last formed window 30, the punch element 37 reshapes the partially formed window 31 by removing the material defining the walls 35 and 36 and forming walls 27 and 28. The window forming operation is now complete, and the retainer 16 is ready to have the rollers 17 snapped therein.

It will be readily apparent from the foregoing that the walls 26 and 28 of a window 20 are parallel to the walls 27 and 29 of the next adjacent window to one side thereof, and the walls 27 and 29 of the same window are parallel to the walls 26 and 28 of the next adjacent window to the opposite side thereof due to the fact that the walls of each of these two groups are simultaneously formed in a single punching operation.

From the foregoing, it will be readily apparent that the retainer 16 is of a highly desirable construction in that the windows 20 thereof are so formed wherein the rollers 17 may be readily snapped into place within the windows 20 and retained therein. In addition to the advantageous structure of the retainer 16, it will be readily apparent that the retainer may be quickly and accurately formed by automatic punching mechanism having indexing means, and that a very simple punch structure is required to produce the complex wall arrangement of the individual windows of the retainer.

Although a preferred embodiment of the invention has been illustrated and described herein, it is to be understood that minor modifications may be made in the invention in accordance with the spirit and scope thereof, as defined by the appended claims.

I claim:
1. A cylindrical retainer for rollers of the needle and roller bearing type, said retainer having a plurality of roller receiving windows defined by elongated sides and ends, each of said sides including a central wall and outer walls sloping relative to the general plane of the retainer in the vicinity of the particular window side, said central wall and said outer walls lying in different planes disposed in crossing relation with the line of intersection of said planes being disposed within the thickness of the retainer wherein said window sides define opposed V-arranged roller contact surfaces for holding rollers within said windows, all of said planes being disposed in offset relation to the axis of said retainer and parallel to a radial plane passing through a line disposed centrally of the respective window and an adjacent window.

2. A retainer for rollers of the needle and roller bearing type, said retainer having a plurality of roller receiving windows defined by elongated sides and ends, each of said sides including a central wall and outer walls sloping relative to the general plane of the retainer in the vicinity of the particular window side, said central wall and said outer walls lying in different planes disposed in crossing relation with the line of intersection of said planes being disposed within the thickness of the retainer wherein said window sides define opposed V-arranged roller contact surfaces for holding rollers within said windows, each of said walls of each roller receiving window being parallel to a dislike wall of a next adjacent roller receiving window.

3. The cylindrical retainer of claim 1 wherein the retainer is seamless and all of said window walls having visual evidence of being formed by punching.

References Cited by the Examiner
UNITED STATES PATENTS

| | | | |
|---|---|---|---|
| 365,066 | 6/1887 | Haberling | 83—691 |
| 676,782 | 6/1901 | Stimpson | 83—691 |
| 2,611,670 | 9/1952 | Palmgren | 308—217 |
| 2,657,106 | 10/1953 | Lovell | 308—217 |
| 2,765,518 | 10/1956 | Lovell | 29—148.4 |
| 2,805,108 | 9/1957 | Palmgren | 308—217 |
| 3,080,639 | 3/1963 | Maurizi | 29—148.4 |
| 3,163,477 | 12/1964 | Schmidt | 308—217 |

MARTIN P. SCHWADRON, *Primary Examiner.*

WHITEMORE A. WILTZ, FRANK SUSKO,
*Examiners.*

THOMAS H. EAGER, *Assistant Examiner.*